(12) United States Patent
Maruyama et al.

(10) Patent No.: US 9,638,861 B2
(45) Date of Patent: May 2, 2017

(54) OPTICAL TRANSMITTER

(71) Applicant: Fujitsu Optical Components Limited, Kawasaki-shi, Kanagawa (JP)

(72) Inventors: Shinji Maruyama, Sapporo (JP); Seimi Sasaki, Sagamihara (JP); Kohei Shibata, Isehara (JP); Teruhiro Kubo, Kitahiroshima (JP); Shintaro Takeuchi, Sapporo (JP); Hiroshi Kato, Kawasaki (JP); Takehito Tanaka, Yokohama (JP)

(73) Assignee: FUJITSU OPTICAL COMPONENTS LIMITED, Kawasaki (JP)

( * ) Notice: Subject to any disclaimer, the term of this patent is extended or adjusted under 35 U.S.C. 154(b) by 0 days.

(21) Appl. No.: 14/631,358

(22) Filed: Feb. 25, 2015

(65) Prior Publication Data

US 2015/0253506 A1   Sep. 10, 2015

(30) Foreign Application Priority Data

Mar. 7, 2014   (JP) .................. 2014-044605

(51) Int. Cl.
*G02B 6/32* (2006.01)
*G02B 6/30* (2006.01)
*G02B 6/34* (2006.01)

(52) U.S. Cl.
CPC .............. *G02B 6/32* (2013.01); *G02B 6/30* (2013.01); *G02B 6/34* (2013.01)

(58) Field of Classification Search
CPC .............. G02B 6/32; G02B 6/30; G02B 6/34
See application file for complete search history.

(56) References Cited

U.S. PATENT DOCUMENTS 4,397,527 A * 8/1983 Geyer .................. G02B 13/08
                                                      359/489.07
4,552,456 A * 11/1985 Endo ..................... G01S 17/10
                                                      342/70

(Continued)

FOREIGN PATENT DOCUMENTS

CN     203101668 U  *  7/2013
JP     2001-36505       2/2001

(Continued)

OTHER PUBLICATIONS

"Silicon Microlens Array," *Micro-Optics Products and Services Catalog*, axetris: Company of the Leister Group, Jan. 6, 2014, pp. 1-12.

(Continued)

*Primary Examiner* — Peter Radkowski
(74) *Attorney, Agent, or Firm* — Staas & Halsey LLP

(57) ABSTRACT

A first lens transmits a beam of light having a vertical cross-sectional diameter made closer to a horizontal cross-sectional diameter. The beam of light is emitted from an optical waveguide on a substrate and configured such that the vertical cross-sectional diameter which is the diameter of a vertical cross section along the direction of the thickness of the substrate is greater than the horizontal cross-sectional diameter which is the diameter of a horizontal cross section along the direction of the width of the substrate. A second lens is disposed at a position, at which the vertical cross-sectional diameter and the horizontal cross-sectional diameter coincide with each other, so as to focus the beam of light on the optical fiber. The position is closer to the optical fiber than the first lens along the direction of travel of the beam of light transmitted by the first lens.

7 Claims, 4 Drawing Sheets

(56) References Cited

U.S. PATENT DOCUMENTS

| | | | | |
|---|---|---|---|---|
| 4,575,194 A * | 3/1986 | Streifer | G02B 3/0087 | 359/652 |
| 5,251,060 A * | 10/1993 | Uenishi | G02B 5/001 | 359/328 |
| 5,295,147 A * | 3/1994 | Jewell | H01S 5/18358 | 372/45.01 |
| 5,319,528 A * | 6/1994 | Raven | G02B 27/09 | 359/318 |
| 5,463,534 A * | 10/1995 | Raven | G02B 27/09 | 359/318 |
| 5,530,709 A * | 6/1996 | Waarts | G02B 6/03605 | 372/6 |
| 5,530,711 A * | 6/1996 | Scheps | H01S 3/094034 | 372/20 |
| 5,677,920 A * | 10/1997 | Waarts | G02B 6/03605 | 372/6 |
| 5,841,797 A * | 11/1998 | Ventrudo | G02B 6/02076 | 250/225 |
| 5,973,853 A * | 10/1999 | Gaebe | G02B 3/06 | 359/668 |
| 6,026,206 A * | 2/2000 | Gaebe | G02B 6/4206 | 385/33 |
| 6,041,072 A * | 3/2000 | Ventrudo | G02B 6/02076 | 372/102 |
| 6,157,502 A * | 12/2000 | Kathman | G02B 27/09 | 359/641 |
| 6,526,089 B1 * | 2/2003 | Haeno | G02B 27/09 | 219/121.58 |
| 6,530,697 B1 * | 3/2003 | Johnson | G02B 6/29311 | 385/33 |
| 6,678,432 B2 * | 1/2004 | Shigeta | H01S 5/02216 | 372/26 |
| 6,801,492 B2 * | 10/2004 | Lee | G11B 7/1362 | 359/731 |
| 6,910,780 B2 * | 6/2005 | Vail | H01S 5/40 | 359/577 |
| 7,164,865 B2 * | 1/2007 | Tatsuno | H01S 5/0687 | 372/20 |
| 7,212,326 B2 * | 5/2007 | Wooten | G02F 1/225 | 359/237 |
| 7,267,492 B2 * | 9/2007 | Ikeda | G02B 6/4204 | 385/88 |
| 7,330,617 B2 * | 2/2008 | Aota | G02B 6/2931 | 359/290 |
| 7,457,487 B2 * | 11/2008 | Miller | B82Y 20/00 | 257/E21.129 |
| 7,532,379 B2 * | 5/2009 | Miller | B82Y 20/00 | 359/245 |
| 7,618,201 B2 * | 11/2009 | Ibe | G02B 6/4204 | 359/337.2 |
| 9,229,169 B2 * | 1/2016 | Doany | G02B 6/32 | |
| 9,285,554 B2 * | 3/2016 | Doany | G02B 6/4214 | |
| 2002/0051270 A1 * | 5/2002 | Tatsuno | H01S 5/0687 | 398/192 |
| 2002/0051360 A1 * | 5/2002 | Solodovnikov | G02B 27/09 | 362/244 |
| 2002/0064333 A1 * | 5/2002 | Shigeta | H01S 5/02216 | 385/14 |
| 2002/0075785 A1 * | 6/2002 | Lee | G11B 7/1362 | 369/112.26 |
| 2003/0142903 A1 * | 7/2003 | Johnson | G02B 6/29311 | 385/31 |
| 2003/0194237 A1 | 10/2003 | Farries et al. | | |
| 2004/0013431 A1 * | 1/2004 | Vail | H01S 5/40 | 398/84 |
| 2005/0078383 A1 * | 4/2005 | Jones | G02B 6/4206 | 359/717 |
| 2005/0168819 A1 * | 8/2005 | Vail | H01S 5/40 | 359/557 |
| 2006/0056002 A1 * | 3/2006 | Wooten | G02F 1/225 | 359/245 |
| 2006/0104575 A1 * | 5/2006 | Ikeda | G02B 6/4204 | 385/88 |
| 2007/0077003 A1 * | 4/2007 | Aota | G02B 6/2931 | 385/18 |
| 2007/0177151 A1 | 8/2007 | Isomura et al. | | |
| 2008/0166098 A1 * | 7/2008 | Ibe | G02B 6/4204 | 385/134 |
| 2008/0232735 A1 * | 9/2008 | Miller | B82Y 20/00 | 385/2 |
| 2009/0086302 A1 * | 4/2009 | Miller | B82Y 20/00 | 359/245 |
| 2011/0299808 A1 * | 12/2011 | Matsuoka | G02B 6/4214 | 385/14 |
| 2013/0084039 A1 * | 4/2013 | Doany | G02B 6/32 | 385/33 |
| 2013/0209026 A1 * | 8/2013 | Doany | G02B 6/4214 | 385/14 |
| 2014/0177995 A1 * | 6/2014 | Mohammed | G02B 6/36 | 385/14 |
| 2015/0147018 A1 * | 5/2015 | Itou | H04B 10/5053 | 385/3 |

FOREIGN PATENT DOCUMENTS

| | | |
|---|---|---|
| JP | 2007-73552 | 3/2007 |
| JP | 2007-201939 | 8/2007 |
| WO | 2013/025327 A2 | 2/2013 |

OTHER PUBLICATIONS

"Refractive Index of Indium Phosphide," Filmetrics, Inc., Jan. 6, 2014, 1 page (with 1 translation page).

Office Action issued by the State Intellectual Property Office of China on Feb. 16, 2016 in corresponding Chinese patent application No. 201510087781.7.

* cited by examiner

OPTICAL TRANSMITTER

CROSS-REFERENCE TO RELATED APPLICATION

This application is based upon and claims the benefit of priority of the prior Japanese Patent Application No. 2014-044605, filed on Mar. 7, 2014, the entire contents of which are incorporated herein by reference.

FIELD

The embodiment discussed herein is directed to an optical transmitter.

BACKGROUND

Recently, in optical communication systems, for example, optical modulators employing semiconductors such as indium phosphorus (InP) (hereinafter referred to as the "semiconductor optical modulator") have been under development in place of optical modulators employing lithium niobate ($LiNbO_3$) (hereinafter referred to as the "LN optical modulator"). When compared with the LN modulator, the semiconductor modulator can attain a higher efficiency of applying an electric field, thus facilitating reduction in drive voltage and size. That is, when compared with LN optical modulator, the semiconductor optical modulator can be more easily reduced in size.

However, the semiconductor waveguide confines light at a higher level when compared with the lithium niobate ($LiNbO_3$) waveguide, with the waveguide mode profile significantly reduced. Thus, when a signal beam outputted from the semiconductor optical modulator is emitted from the optical waveguide toward a downstream optical fiber, the angle of divergence of the signal beam is greater than the angle of divergence of a signal beam outputted from the LN optical modulator. The increase in the angle of divergence of the signal beam is not preferable due to the possibility of causing interference between signal beams.

In this context, such a technique has been suggested by which a collimate lens that collimates the signal beam is disposed between the optical waveguide and a condenser lens that focuses the signal beam on the optical fiber. This technique allows the collimate lens to collimate the signal beam and thereby reduce an increase in the angle of divergence of the signal beam, so that the interference of signal beams is prevented.

Patent Document 1: Japanese Laid-open Patent Publication No. 2007-201939 is introduced as the Prior Art Document.

However, it is difficult to improve the coupling efficiency between the optical waveguide and the optical fiber only by interposing the collimate lens between the optical waveguide and the condenser lens as in the aforementioned conventional technique.

That is, even when the increase in the angle of divergence of the signal beam is reduced, it is known in an optical transmitter with the semiconductor optical modulator that the diameter of a vertical cross section of a signal beam along the direction of the thickness of a substrate on which the optical waveguide is formed is greater than the diameter of a horizontal cross section of the signal beam along the direction of the width of the substrate. In other words, for the optical transmitter with the semiconductor optical modulator, a cross-sectional shape of the signal beam when viewed in the direction of travel of the signal beam emitted from the optical waveguide toward the optical fiber takes an elliptical shape with the major axis along the direction of the thickness of the substrate and the minor axis along the direction of the width of the substrate. Thus, the cross-sectional shape of the signal beam focused by the condenser lens on the optical fiber is also maintained in an elliptical shape. This may possibly cause a loss in the light by allowing the signal beam having an elliptical cross-sectional shape to be incident on the optical fiber having a circular cross-sectional shape. That is, when the semiconductor optical modulator is employed, the cross-sectional shape of the signal beam emitted from the optical waveguide does not coincide with the cross-sectional shape of the optical fiber, thus possibly causing the coupling efficiency between the optical waveguide and the optical fiber to be lowered.

In response to this, it can be conceived to provide such a structure in which a prism is additionally disposed between the collimate lens and the condenser lens in order to form the cross-sectional shape of the signal beam emitted from the optical waveguide into the cross-sectional shape of the optical fiber.

However, the structure in which the prism is additionally disposed leads to an increase in the parts count by the prism, thus possibly causing increases in the complexity of the structure and the size of the apparatus.

SUMMARY

In one an aspect, an optical transmitter disclosed in the present application includes a substrate, an optical fiber, a first lens, and a second lens. The substrate has an optical waveguide formed thereon. The first lens transmits a beam of light having a vertical cross-sectional diameter made closer to a horizontal cross-sectional diameter. The beam of light is emitted from the optical waveguide toward the optical fiber and configured such that the vertical cross-sectional diameter which is the diameter of a vertical cross section along a direction of the thickness of the substrate is greater than the horizontal cross-sectional diameter which is the diameter of a horizontal cross section along a direction of the width of the substrate. The second lens is disposed at a position, at which the vertical cross-sectional diameter and the horizontal cross-sectional diameter coincide with each other, so as to focus the beam of light on the optical fiber. The position is closer to the optical fiber than the first lens along the direction of travel of the beam of light which is transmitted by the first lens.

According to an aspect of an embodiment, an optical transmitter includes a substrate with an optical waveguide formed thereon; an optical fiber; a first lens that transmits a beam of light having a vertical cross-sectional diameter made closer to a horizontal cross-sectional diameter, the beam of light being emitted from the optical waveguide toward the optical fiber and being configured such that the vertical cross-sectional diameter which is a diameter of a vertical cross section along a direction of a thickness of the substrate is greater than the horizontal cross-sectional diameter which is a diameter of a horizontal cross section along a direction of a width of the substrate; and a second lens that is disposed at a position at which the vertical cross-sectional diameter and the horizontal cross-sectional diameter of the beam of light coincide with each other, along a direction of travel of the beam of light transmitted by the first lens, the second lens focusing the beam of light on the optical fiber.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENT

Preferred embodiments of the present invention will be explained with reference to accompanying drawings. Note that the techniques disclosed herein will not be limited by this embodiment.

Figure 1:
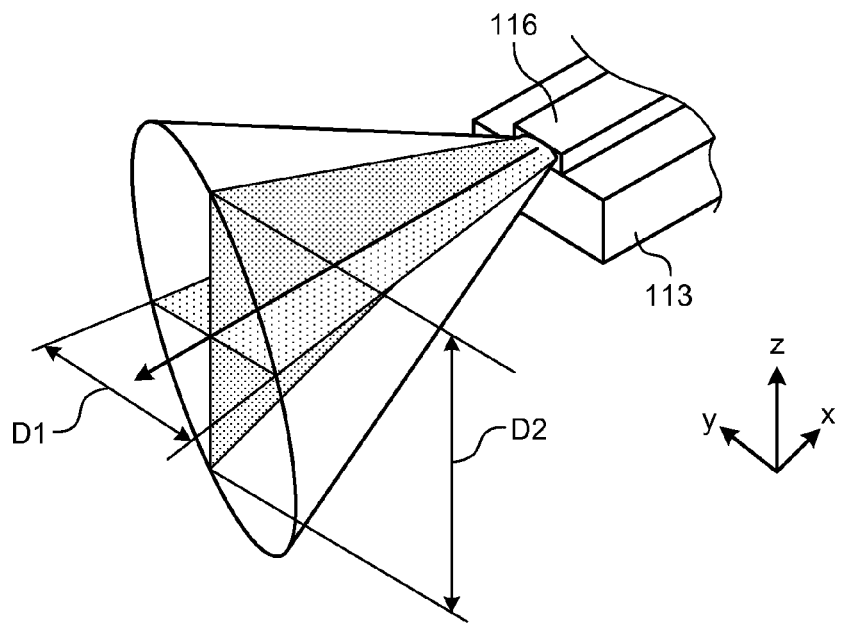
FIG. 1 is a view illustrating an example of a shape of a signal beam emitted from an optical waveguide toward an optical fiber.
Figure 2:
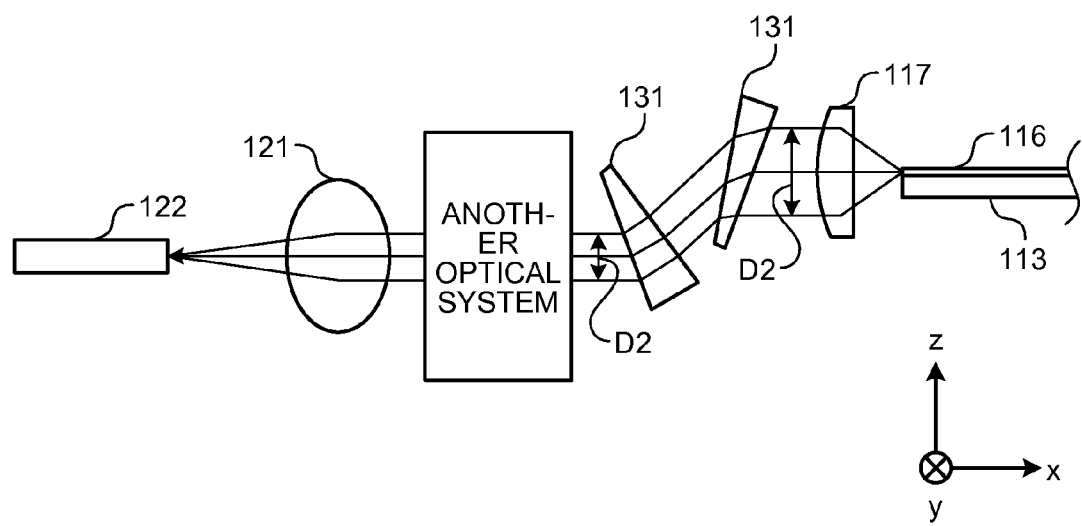
FIG. 2 is a view illustrating an example of shaping a signal beam using prisms.

Referring to FIGS. 1 and 2, a description will be first made to the technique on which the optical transmitter according to the first embodiment relies. FIG. 1 is a view illustrating an example of the shape of a signal beam emitted from an optical waveguide to an optical fiber. In FIG. 1, it is assumed that the x-axis is defined along the longitudinal direction of a substrate 113; the y-axis is defined along the direction of the width of the substrate 113; and the z-axis is defined along the direction of the thickness of the substrate 113.

As illustrated in FIG. 1, the optical transmitter with a semiconductor optical modulator is configured such that when a signal beam is emitted toward an optical fiber (not illustrated) from an optical waveguide 116 on the substrate 113, the diameter D2 of a vertical cross section of the signal beam along the z-axis direction is greater than the diameter D1 of a horizontal cross section of the signal beam along the y-axis direction. In other words, the optical transmitter with the semiconductor optical modulator is configured such that when viewed in the direction of travel of the signal beam emitted from the optical waveguide 116 toward the optical fiber, the signal beam has an elliptical cross-sectional shape with the major axis along the z-axis direction and the minor axis along the y-axis direction. On the other hand, the optical fiber typically has a circular cross-sectional shape. Thus, the signal beam emitted from the optical waveguide 116 has a cross-sectional shape that does not coincide with the cross-sectional shape of the optical fiber. For this reason, there is a possibility that the coupling efficiency between the optical waveguide 116 and the optical fiber may be reduced.

To address this problem, a structure can be thought which employs prisms that forms the cross-sectional shape of the signal beam emitted from the optical waveguide 116 into the cross-sectional shape of the optical fiber. FIG. 2 is a view illustrating an example of shaping the signal beam using the prisms. In the example illustrated in FIG. 2, there are disposed anamorphic prisms 131 between a collimate lens 117 disposed downstream of the optical waveguide 116 on the substrate 113 and a condenser lens 121 that focuses the signal beam onto an optical fiber 122. The signal beam emitted from the optical waveguide 116 toward the optical fiber 122 is collimated by the collimate lens 117. The signal beam collimated by the collimate lens 117 is directed to the anamorphic prisms 131 for input. The anamorphic prisms 131 allow the cross-sectional shape of the signal beam supplied from the collimate lens 117 to be formed into the cross-sectional shape of the optical fiber 122. More specifically, the anamorphic prisms 131 have such a feature shape that refracts the signal beam so that the diameter D2 of a vertical cross section of the signal beam along the z-axis direction becomes closer to the diameter D1 of the horizontal cross section of the signal beam along the y-axis direction, and shapes the cross-sectional shape of the signal beam using the feature shape. The signal beam shaped by the anamorphic prisms 131 is directed to the condenser lens 121 via another optical system for input and then focused on the optical fiber 122 via the condenser lens 121.

However, the aforementioned structure with the anamorphic prisms 131 additionally disposed causes an increase in the parts count by the anamorphic prisms 131, thus possibly leading to increases in the complexity of the structure and the size of the apparatus. In this context, for the optical transmitter according to the first embodiment, the collimate lens and the condenser lens have been devised to be disposed in order to provide an improved coupling efficiency between the optical waveguide 116 and the optical fiber without employing the anamorphic prisms 131.

Figure 3:
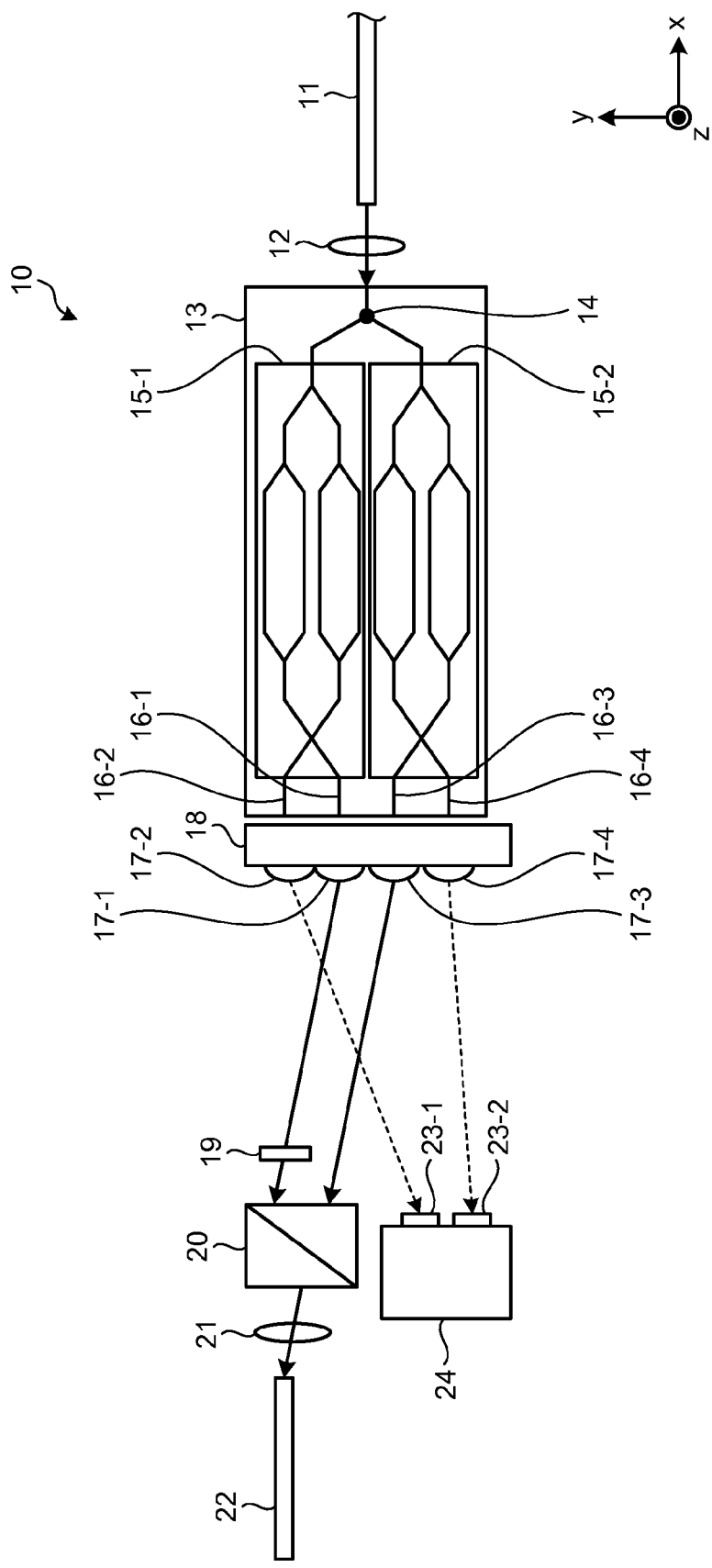
FIG. 3 is a view illustrating an example of a configuration of an optical transmitter according to a first embodiment.

Now, referring to FIG. 3, a description will be made to an example configuration of an optical transmitter 10 according to the first embodiment. FIG. 3 is a view illustrating an example configuration of the optical transmitter according to the first embodiment.

The optical transmitter 10 illustrated in FIG. 3 includes an optical fiber 11, a lens 12, a substrate 13, an optical branching path 14, optical modulators 15-1 and 15-2, and optical waveguides 16-1 to 16-4. The optical transmitter 10 also includes collimate lenses 17-1 to 17-4 and a retainer 18. The optical transmitter 10 further includes a wavelength plate 19, a PBC 20, a condenser lens 21, and an optical fiber 22. The optical transmitter 10 still further includes PDs 23-1 and 23-2, and a placement member 24.

Note that in FIG. 3, it is assumed that the x-axis is defined along the longitudinal direction of the substrate 13; the y-axis is defined along the direction of the width of the substrate 13; and the z-axis is defined along the direction of the thickness of the substrate 13. It is also assumed that the positive direction of the x-axis is defined to be opposite to the collimate lenses 17-1 to 17-4 along the longitudinal direction of the substrate 13. It is also assumed that the positive direction of the y-axis is defined to be opposite to the optical modulator 15-2 along the direction of the width of the substrate 13. It is also assumed that the positive direction of the z-axis along the direction of the thickness of the substrate 13 is defined to be the surface side of the substrate 13 on which the optical branching path 14, the optical modulators 15-1 and 15-2, and the optical waveguides 16-1 to 16-4 are provided.

The optical fiber 11 outputs light emitted by a light source (not illustrated) to the lens 12. The lens 12 condenses the light outputted from the optical fiber 11. The substrate 13 has the optical branching path 14, the optical modulators 15-1 and 15-2, and the optical waveguides 16-1 to 16-4, which are provided thereon.

The optical branching path 14 branches the light condensed by the lens 12 into two beams of light using a coupler or the like, and then outputs one of the two branched beams to the optical modulator 15-1 and the other beam to the optical modulator 15-2.

The optical modulators 15-1 and 15-2 are arranged in parallel in the direction of the width of the substrate 13, that is, along the y-axis direction. For example, the optical modulators 15-1 and 15-2 may be made of a semiconductor such as indium phosphorus (InP). Of those modulators, the optical modulator 15-1 uses an electrical signal to modulate the one beam of light supplied from the optical branching path 14. The light is modulated by the optical modulator 15-1 to thereby provide two signal beams. One of the two signal beams serves as a signal beam, while the other signal beam acts as a monitor beam for monitoring the signal beam. The optical modulator 15-1 outputs the signal beam to the optical waveguide 16-1 and the monitor beam to the optical waveguide 16-2.

The optical modulator 15-2 uses an electrical signal to modulate the other beam of light supplied from the optical branching path 14. The optical modulator 15-2 modulates light to thereby provide two signal beams. One of the two signal beams serves a signal beam, while the other signal beam acts as a monitor beam for monitoring the signal beam. The optical modulator 15-2 outputs the signal beam to the optical waveguide 16-3 and the monitor beam to the optical waveguide 16-4.

The optical waveguides 16-1 to 16-4 are formed on the substrate 13 and guide the signal beams and the monitor beams. More specifically, the optical waveguides 16-1 to 16-4 are formed on the substrate 13 such that the optical waveguides 16-1 and 16-3 that guide the signal beams are sandwiched along the y-axis direction between the optical waveguides 16-2 and 16-4 that guide the monitor beams. Then, the optical waveguide 16-1 guides the signal beam supplied from the optical modulator 15-1 in the negative direction of the x-axis. Furthermore, the optical waveguide 16-2 guides the monitor beam supplied from the optical modulator 15-1 in the negative direction of the x-axis. Furthermore, the optical waveguide 16-3 guides the signal beam supplied from the optical modulator 15-2 in the negative direction of the x-axis. Furthermore, the optical waveguide 16-4 guides the monitor beam supplied from the optical modulator 15-2 in the negative direction of the x-axis. Note that the shape of the optical waveguides 16-1 and 16-3 that guide the signal beams will be discussed later in more detail.

The collimate lenses 17-1 to 17-4 are formed, for example, of silicon and have the same curvature. The collimate lenses 17-1 to 17-4 transmit the signal beams and the monitor beams emitted from the optical waveguides 16-1 to 16-4. More specifically, the collimate lens 17-1 transmits the signal beam emitted from the optical waveguide 16-1. The collimate lens 17-2 transmits the monitor beam emitted from the optical waveguide 16-2. The collimate lens 17-3 transmits the signal beam emitted from the optical waveguide 16-3. The collimate lens 17-4 transmits the monitor beam emitted from the optical waveguide 16-4. Note that the collimate lenses 17-1 and 17-3 that transmit the signal beams will be discussed later in more detail concerning the shape thereof and the position at which the lenses are disposed.

The retainer 18 is formed, for example, of silicon, and holds the collimate lenses 17-1 to 17-4 in an array along the y-axis direction. More specifically, the retainer 18 holds the collimate lenses 17-1 to 17-4 while the optical axis of at least one of the collimate lenses 17-1 to 17-4 is dislocated in a predetermined direction from the optical axis of at least one of the optical waveguides 16-1 to 16-4. The retainer 18 holds the plurality of the collimate lenses 17-1 to 17-4 under this condition, thereby allowing a signal beam to be emitted from each of the collimate lens 17-1 and the collimate lens 17-3 to the PBC 20. The retainer 18 also emits the monitor beam through each of the collimate lens 17-2 and the collimate lens 17-4 to the PDs 23-1 and 23-2.

The wavelength plate 19 rotates by 90 degrees the polarization of the signal beam emitted from the collimate lens 17-1 relative to the polarization of the signal beam emitted from the collimate lens 17-3. The PBC 20, which is a polarization beam combiner, polarizes and combines the signal beam having the polarization rotated by the wavelength plate 19 and the signal beam emitted from the collimate lens 17-3, and then emits the polarized multiplex signal beam obtained by polarizing and combining the signal beams to the condenser lens 21.

The condenser lens 21 focuses the polarized multiplex signal beam emitted from the PBC 20 on the optical fiber 22. Note that the position at which the condenser lens 21 is located will be discussed in more detail later.

The optical fiber 22 transmits, to the downstream side, the polarized multiplex signal beam condensed by the condenser lens 21.

The PDs 23-1 and 23-2, which are each a light-receiving element, receive the monitor beams emitted from the collimate lens 17-2 and the collimate lens 17-4, respectively. The placement member 24 allows the PDs 23-1 and 23-2 to be disposed on one side of the PBC 20 along the y-axis direction.

Figure 4:
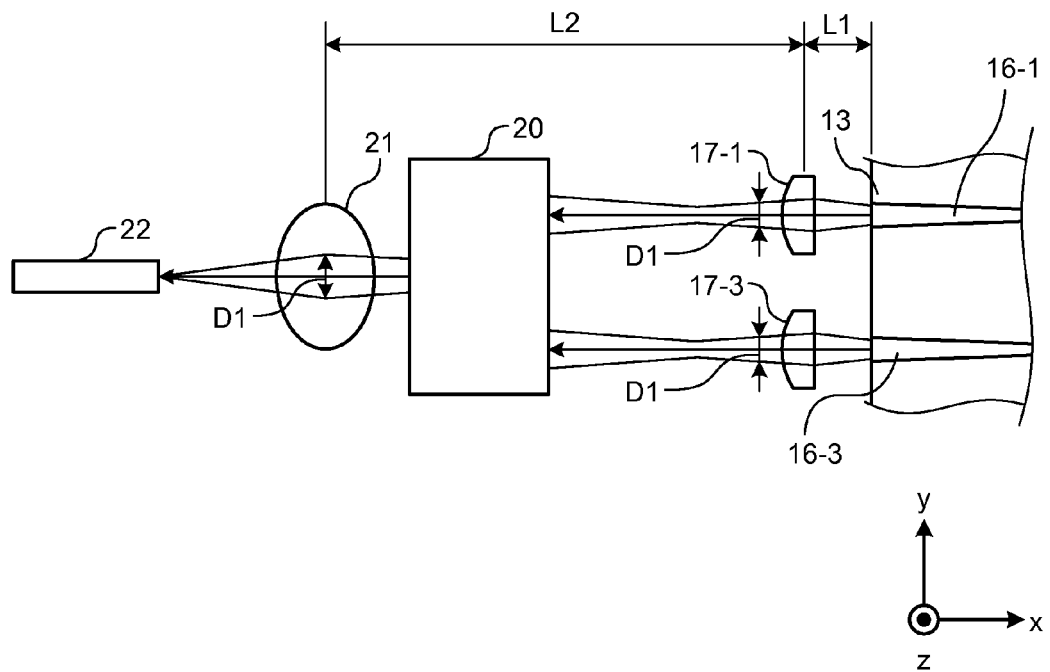
FIG. 4 is a plan view illustrating a substrate, waveguides, collimate lenses, a PBC, a condenser lens, and an optical fiber that are illustrated in FIG. 3, when viewed in the direction of the thickness of the substrate.
Figure 5:
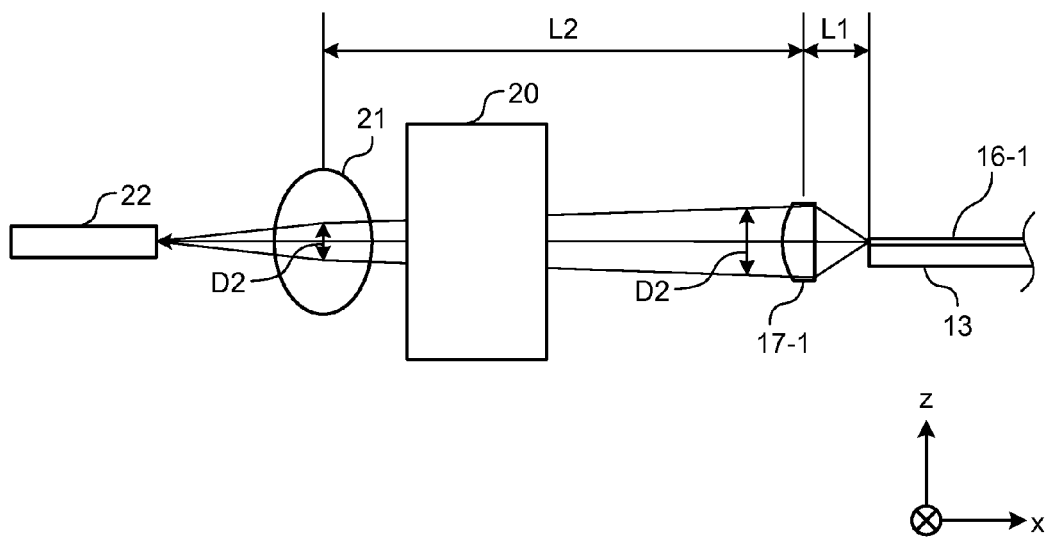
FIG. 5 is a side view illustrating the substrate, a waveguide, a collimate lens, the PBC, the condenser lens, and an optical fiber that are illustrated in FIG. 3, when viewed in the direction of the width of the substrate.

Now, referring to FIGS. 4 to 7, a description will be made in more detail to the position at which the collimate lenses 17-1 and 17-3 are located and the shape thereof, the position at which the condenser lens 21 is located, and the shape of the optical waveguides 16-1 and 16-3. FIG. 4 is a plan view illustrating the substrate, the waveguides, the collimate lenses, the PBC, the condenser lens, and the optical fiber that are illustrated in FIG. 3, when viewed in the direction of the thickness of the substrate. FIG. 5 is a side view illustrating the substrate, a waveguide, a collimate lens, the PBC, the condenser lens, and the optical fiber that are illustrated in FIG. 3, when viewed in the direction of the width of the substrate. Note that in FIGS. 4 and 5, for convenience of explanation, the other optical parts such as the retainer 18 and the wavelength plate 19 are omitted. Furthermore, in the descriptions below, the collimate lenses 17-1 and 17-3 will be expressed as "the collimate lens 17" when the lenses are not specifically distinguished from each other, while the optical waveguides 16-1 and 16-3 will be expressed as "the optical waveguide 16" when the waveguides are not specifically distinguished from each other.

As illustrated in FIGS. 4 and 5, the collimate lens 17 is disposed at a predetermined distance L1 along the negative direction of the x-axis from the emitting edge of the optical waveguide 16 through which a signal beam is emitted. The collimate lens 17 transmits the signal beam emitted from the optical waveguide 16 toward the optical fiber 22. The signal beam emitted from the optical waveguide 16 toward the optical fiber 22 is shaped such that the diameter of a vertical cross section along the z-axis direction (hereinafter referred to as "the vertical cross-sectional diameter") is greater than the diameter of a horizontal cross section along the y-axis direction (hereinafter referred to as "the horizontal cross-sectional diameter"). That is, when viewed in the direction of travel of the signal beam emitted from the optical waveguide 16 toward the optical fiber 22, the cross-sectional shape of the signal beam is elliptical like the cross-sectional shape of the signal beam illustrated in FIG. 1. In contrast to this, the collimate lens 17 is disposed away from the emitting edge of the optical waveguide 16 along the negative direction of the x-axis by the predetermined distance L1, thereby allowing the light emitted from the optical waveguide 16 toward the optical fiber 22 to be transmitted with the vertical cross-sectional diameter D2 made closer to the horizontal cross-sectional diameter D1. Here, the distance L1 is greater than the distance for collimating the signal beam by the collimate lens 17, and selected as appropriate depending on, for example, the curvature of the collimate lens 17. The collimate lens 17 is an example of the first lens.

Furthermore, the emission surface, through which the signal beam is emitted, among the surfaces of the collimate lens 17 when viewed in the y-axis direction has the same curvature as that of the emission surface, through which the signal beam is emitted, among the surfaces of the collimate lens 17 when viewed in the z-axis direction. That is, the shape of the collimate lens 17 when viewed in the y-axis direction and the shape thereof when viewed in the z-axis direction are the same.

The condenser lens 21, which is disposed along the direction of travel of the signal beam transmitted by the collimate lens 17, is located at the position at which the vertical cross-sectional diameter D2 and the horizontal cross-sectional diameter D1 of the signal beam coincide with each other, so as to focus the signal beam onto the optical fiber 22. In the example illustrated in FIGS. 4 and 5, the condenser lens 21 is located away from the collimate lens 17 by the predetermined distance L2 along the negative direction of the x-axis, thereby allowing the signal beam having the vertical cross-sectional diameter D2 and the horizontal cross-sectional diameter D1 equal to each other to be focused on the optical fiber 22. The condenser lens 21 is an example of the second lens.

Figure 6:
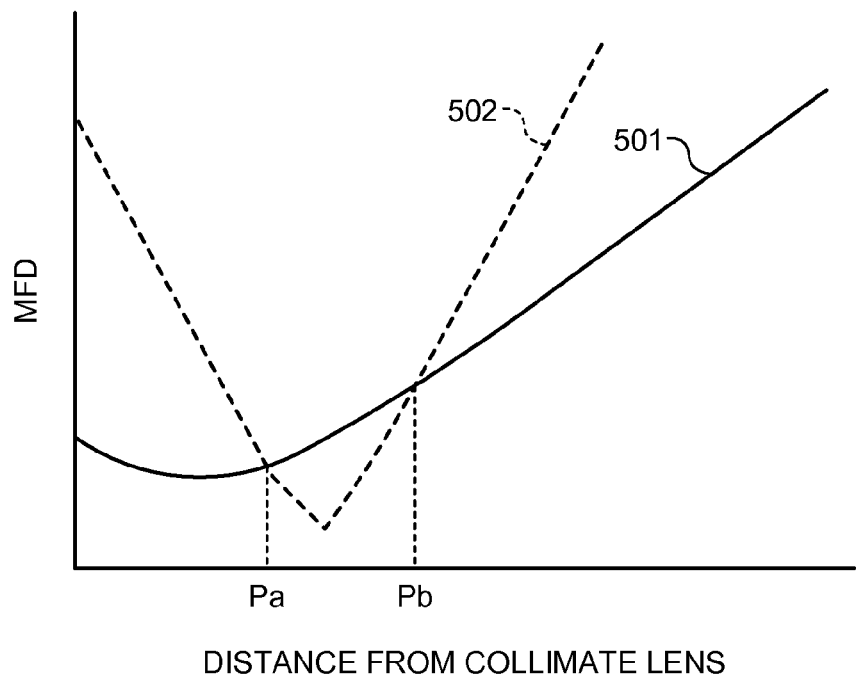
FIG. 6 is an explanatory view illustrating the position at which the condenser lens is disposed in accordance with the first embodiment.

FIG. 6 is an explanatory view illustrating the position at which the condenser lens is located in accordance with the first embodiment. In FIG. 6, the horizontal axis represents the distance L2 from the collimate lens 17 and the vertical axis represents the mode field diameter (MFD) that is the diameter of the signal beam transmitted by the collimate lens 17. Furthermore, in FIG. 6, a graph 501 represents the horizontal cross-sectional diameter D1 of the signal beam transmitted by the collimate lens 17, and a graph 502 represents the vertical cross-sectional diameter D2 of the signal beam transmitted by the collimate lens 17.

As illustrated in FIG. 6, the collimate lens 17 transmits the signal beam, thereby allowing the vertical cross-sectional diameter D2 to become closer to the horizontal cross-sectional diameter D1. Then, the vertical cross-sectional diameter D2 and the horizontal cross-sectional diameter D1 coincide with each other at the position Pa spaced apart from the collimate lens 17 by a predetermined distance along the negative direction of the x-axis. Subsequently, the vertical cross-sectional diameter D2 and the horizontal cross-sectional diameter D1 become unequal to each other and then again coincide with each other at the position Pb that is closer to the optical fiber 22 along the negative direction of the x-axis than the position Pa is. In this case, the condenser lens 21 is disposed at either the position Pa or the position Pb. Then, the signal beam with the vertical cross-sectional diameter D2 and the horizontal cross-sectional diameter D1 which coincide with each other, in other words, the signal beam that is circular in shape when viewed in the direction of travel is focused on the optical fiber 22 through the condenser lens 21. On the other hand, the cross-sectional shape of the optical fiber 22 is typically circular. That is, the condenser lens 21 is disposed at either the position Pa or the position Pb, thereby allowing the cross-sectional shape of the signal beam focused on the optical fiber 22 through the condenser lens 21 to coincide with the cross-sectional shape of the optical fiber 22.

Referring back to the description in relation to FIGS. 4 and 5, the optical waveguide 16 is increased in the width along the y-axis direction with the decreasing distance to the emitting edge of the optical waveguide 16 through which the signal beam is emitted. In other words, the width of the optical waveguide 16 along the y-axis direction is the maximum at the emitting edge of the optical waveguide 16. Here, as the width of the emitting edge of the optical waveguide 16 increases, the compression of the mode field of the signal beam in the optical waveguide 16 is alleviated. This leads to a decrease in the angle of divergence of the signal beam that is emitted from the optical waveguide 16 and incident on the collimate lens 17. This in turn causes the position of the beam waist of the signal beam transmitted by the collimate lens 17 to be brought closer to the collimate lens 17. As a result, the position at which the vertical cross-sectional diameter D2 and the horizontal cross-sectional diameter D1 of the signal beam transmitted by the collimate lens 17 coincide with each other is brought closer to the collimate lens 17.

Figure 7:
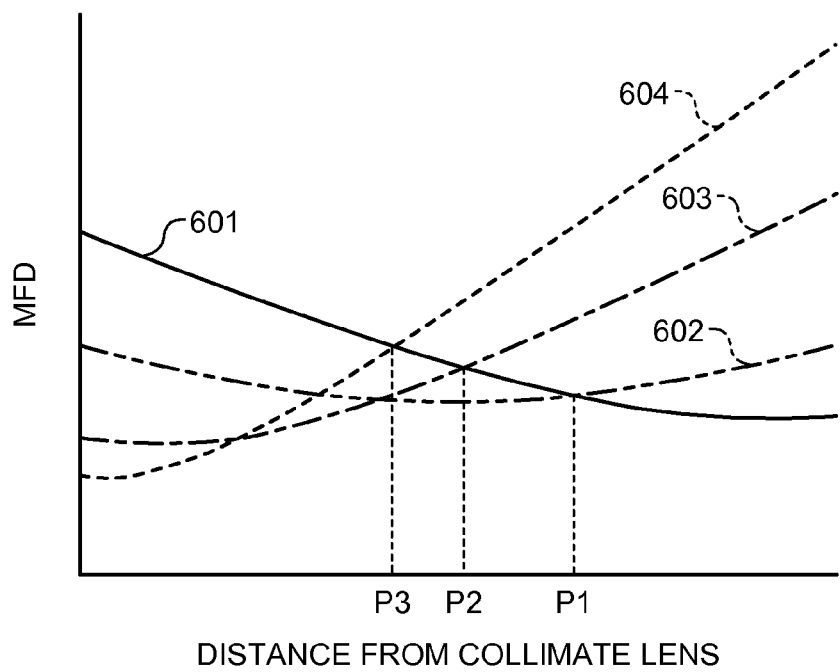
FIG. 7 is a view illustrating the relationship between the width of the optical waveguide and the shape of the signal beam in accordance with the first embodiment.

FIG. 7 is a view illustrating the relationship between the width of the optical waveguide in accordance with the first embodiment and the shape of the signal beam. In FIG. 7, the horizontal axis represents the distance L2 from the collimate lens 17, and the vertical axis represents the mode field diameter (MFD) that is the diameter of the signal beam transmitted by the collimate lens 17. Furthermore, in FIG. 7, a graph 601 represents the vertical cross-sectional diameter D2 of the signal beam transmitted by the collimate lens 17, and graphs 602 to 604 each represent the horizontal cross-sectional diameter D1 of the signal beam transmitted by the collimate lens 17. Furthermore, the graph 602 represents the horizontal cross-sectional diameter D1 of the signal beam when the width of the optical waveguide 16 along the y-axis direction is constant. On the other hand, the graphs 603 and 604 each represent the horizontal cross-sectional diameter D1 of the signal beam when the width of the optical waveguide 16 along the y-axis direction is increased with the decreasing distance to the emitting edge of the optical waveguide 16. Note that it is assumed that the width of the emitting edge of the optical waveguide 16 in the graph 604 is greater than the width of the emitting edge of the optical waveguide 16 in the graph 603.

As illustrated in FIG. 7, when the width of the optical waveguide 16 along the y-axis direction is constant, the vertical cross-sectional diameter D2 and the horizontal cross-sectional diameter D1 of the signal beam transmitted by the collimate lens 17 coincide with each other at the position P1. On the other hand, when the width of the optical waveguide 16 along the y-axis direction increases with the decreasing distance to the emitting edge of the optical waveguide 16, the vertical cross-sectional diameter D2 and the horizontal cross-sectional diameter D1 of the signal beam transmitted by the collimate lens 17 coincide with each other at the position P2 that is closer to the collimate lens 17 than the position P1 is. Furthermore, when the width of the emitting edge of the optical waveguide 16 is increased, the vertical cross-sectional diameter D2 and the horizontal cross-sectional diameter D1 of the signal beam transmitted by the collimate lens 17 coincide with each other at the position P3 that is closer to the collimate lens 17 than the position P2 is. As described above, when the width of the optical waveguide 16 along the y-axis direction increases with the decreasing distance to the emitting edge of the optical waveguide 16, the position at which the vertical cross-sectional diameter D2 and the horizontal cross-sectional diameter D1 of the signal beam transmitted by the collimate lens 17 coincide with each other is brought closer to the collimate lens 17.

As described above, in the optical transmitter 10 of the first embodiment, the collimate lens 17 transmits the light, which is emitted from the optical waveguide 16 toward the optical fiber 22, with the vertical cross-sectional diameter made closer to the horizontal cross-sectional diameter. Then, the condenser lens 21 is located at the position at which the vertical cross-sectional diameter and the horizontal cross-sectional diameter of the signal beam coincide with each other along the direction of travel of the signal beam transmitted by the collimate lens 17, so as to focus the signal beam with the vertical cross-sectional diameter and the horizontal cross-sectional diameter equal to each other onto the optical fiber 22. Thus, according to the first embodiment, the cross-sectional shape of the signal beam which is emitted from the optical waveguide 16 and focused on the optical fiber 22 through the condenser lens 21 can be made equal to the circular cross-sectional shape of the optical fiber 22. Consequently, when compared with a structure that is additionally provided with an amorphic prism, the first embodiment makes it possible to implement a compact and simplified structure that provides an improved coupling efficiency between the optical waveguide 16 and the optical fiber 22.

Furthermore, the optical transmitter 10 of the first embodiment is configured such that the emission surface, through which the signal beam is emitted, among the surfaces of the collimate lens 17 when viewed in the direction of the width of the substrate 13 has the same curvature as that of the emission surface, through which the signal beam is emitted, among the surfaces of the collimate lens 17 when viewed in the direction of the thickness of the substrate 13. Thus, when compared with the amorphic prism, according to the first embodiment, the collimate lens 17 simplified in the shape and the condenser lens 21 can be used in combination to provide an improved coupling efficiency between the optical waveguide 16 and the optical fiber 22.

Furthermore, the optical transmitter 10 of the first embodiment is configured such that the retainer 18 holds the collimate lenses 17-1 to 17-4 in an array along the direction of the width of the substrate 13. Thus, according to the first embodiment, it is possible to reduce the size of the apparatus along the direction of the width of the substrate when compared with the structure in which a plurality of collimate lenses are individually held along the direction of the width of the substrate.

Furthermore, in the optical transmitter 10 of the first embodiment, the retainer 18 and the collimate lenses 17-1 to 17-4 are made of silicon. Thus, according to the first embodiment, by etching or the like, the retainer 18 and the collimate lenses 17-1 to 17-4 can be formed integrally, and as well, the collimate lenses 17-1 to 17-4 can be reduced in thickness.

Furthermore, the optical transmitter 10 of the first embodiment is configured such that the width of the optical waveguide 16 along the direction of the width of the substrate 13 increases with the decreasing distance to the emitting edge of the optical waveguide 16 through which the signal beam is emitted. Thus, according to the first embodiment, the position at which the vertical cross-sectional diameter D2 and the horizontal cross-sectional diameter D1 of the signal beam transmitted by the collimate lens 17 coincide with each other can be brought closer to the collimate lens 17. Thus, according to the first embodiment, the position at which the condenser lens 21 is disposed, that is, the position at which the vertical cross-sectional diameter D2 and the horizontal cross-sectional diameter D1 coincide with each other can be brought closer to the collimate lens 17. As a result, according to the first embodiment, the apparatus can be further reduced in size.

One aspect of an optical transmitter disclosed in the present application produces an effect that an improved coupling efficiency between the optical waveguide and the optical fiber can be implemented with a compact and simplified structure.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. An optical transmitter comprising:
a substrate with an optical waveguide formed thereon, the optical waveguide guiding a beam of light output from an optical modulator made of a semiconductor;
an optical fiber;
a first lens that transmits the beam of light having a vertical cross-sectional diameter made closer to a horizontal cross-sectional diameter, the beam of light being emitted from the optical waveguide toward the optical fiber and being configured such that the vertical cross-sectional diameter which is a diameter of a vertical cross section along a direction of a thickness of the substrate is greater than the horizontal cross-sectional diameter which is a diameter of a horizontal cross section along a direction of a width of the substrate; and
a second lens that is disposed at a position at which the vertical cross-sectional diameter and the horizontal cross-sectional diameter of the beam of light coincide with each other, along a direction of travel of the beam of light transmitted by the first lens, the second lens focusing the beam of light on the optical fiber, wherein
the first lens is a collimate lens and transmits the beam of light having the vertical cross-sectional diameter made closer to the horizontal cross-sectional diameter by being, along a longitudinal direction of the substrate from an emitting edge of the optical waveguide, disposed at a second distance that is greater than a first distance for collimating the beam of light so that the vertical cross-sectional diameter and the horizontal cross-sectional diameter of the beam of light coincide with each other at two positions along the direction of travel of the beam of light transmitted by the first lens, and
the second lens is disposed at one of the two positions.

2. The optical transmitter according to claim 1, wherein an emission surface, through which the beam of light is emitted, among surfaces of the first lens when viewed in the direction of the width of the substrate has the same curvature as a curvature of an emission surface, through which the beam of light is emitted, among the surfaces of the first lens when viewed in the direction of the thickness of the substrate.

3. The optical transmitter according to claim 1, further comprising a retainer that holds a plurality of the first lenses in an array along the direction of the width of the substrate.

4. The optical transmitter according to claim 3, wherein the retainer and the plurality of first lenses are made of silicon.

5. The optical transmitter according to claim 1, wherein the optical waveguide has a width along the direction of the width of the substrate, the width increasing with a decreasing distance to an emitting edge of the optical waveguide through which the beam of light is emitted.

6. The optical transmitter according to claim 1, wherein the second distance is selected depending on a curvature of the collimate lens.

7. The optical transmitter according to claim 1, wherein the second lens is disposed at a position at which the vertical cross-sectional diameter and the horizontal cross-sectional diameter of the beam of light coincide with each other and which is, in the direction of travel of the beam of light transmitted by the first lens, away from a position at which the horizontal cross-sectional diameter of the beam of light becomes minimum.

* * * * *